Dec. 10, 1946.          B. M. RANDALL              2,412,534
                  IMPREGNATED COMPOSITE BOARD
                      Filed Dec. 5, 1942
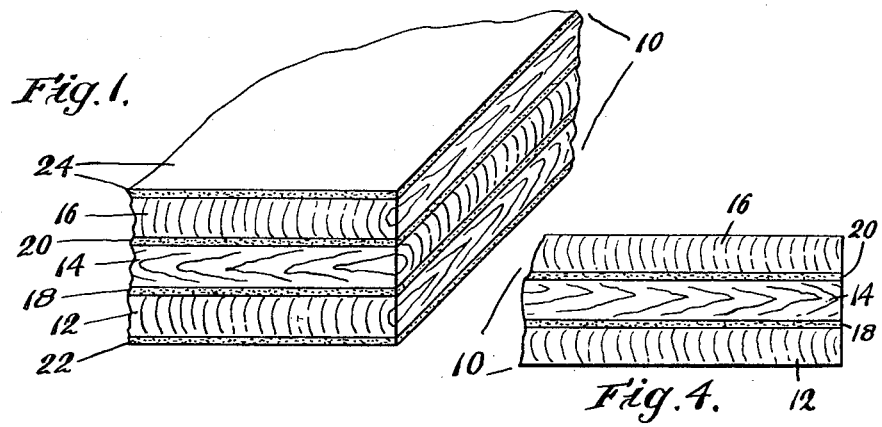
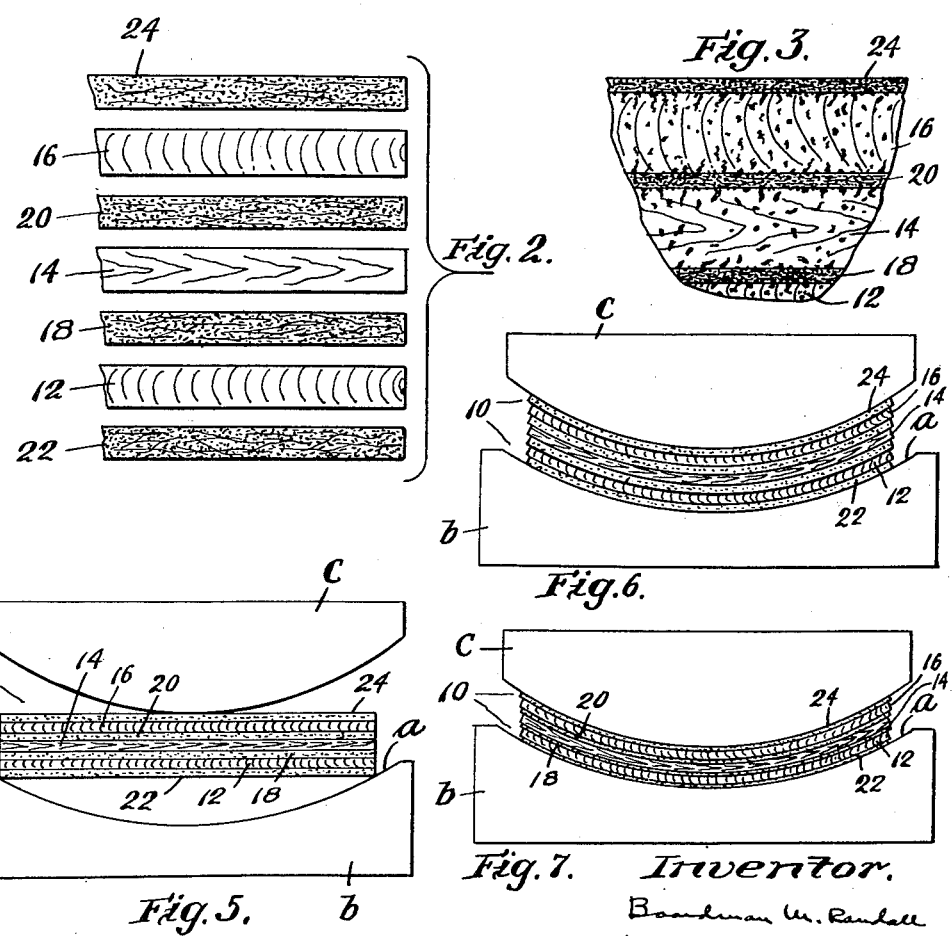

Patented Dec. 10, 1946

2,412,534

UNITED STATES PATENT OFFICE 2,412,534

IMPREGNATED COMPOSITE BOARD

Boardman M. Randall, Portsmouth, N. H., assignor to TekWood, Inc., Lakeport, N. H., a corporation of New Hampshire Application December 5, 1942, Serial No. 468,011

4 Claims. (Cl. 154—133)

This invention relates to a novel composite or laminated board having combined sheets of fibrous material, particularly wood veneer sheets, the fibrous sheets being for practical purposes inert to moisture, and to a novel process for making such composite board.

Plywood has been made, heretofore, by bonding together wood veneer sheets by coating the confronting surfaces of the sheets with a liquid bonding agent as, for instance, an artificial resin, as a phenolic, urea or the like resin which, under the heat and pressure of a plate press forms a solid water-impenetrable film between the sheets. Notwithstanding the water inert nature of the bonding film of such plywood, the individual laminations are water-absorbent, and the plywood is not water-inert but can warp and distort out of its original configuration of assembly upon suitable moisture conditions. Plywood also has been made by assembling pairs of wood veneer sheets with an interposed sheet of dry glue or resin subsequently treated, as by being heated, to render it fluid or adhesive, the sheet being thin as compared with the thickness of a wood veneer sheet. Such plywood also is moisture-absorbent.

It has been proposed to make a moisture-inert plywood by impregnating the wood veneer sheets with a waterproofing agent, such as an artificial resin as aforesaid, prior to combining the sheets. In this process the individual veneer sheets are assembled in spaced relation in a tank where they are subjected first to a vacuum and then for hours to a liquid resin impregnating solution under pressure. The impregnated sheets are then removed from the impregnating bath and stacked under cover preventing free circulation of air thereabout, being retained in covered stacked condition for a long period of time, as a day. The sheets are then combined under heat and pressure in a plate press, the resin on the surfaces of confronting sheets acting as the binder, or additional resin binder being applied as may be desired under the particular conditions encountered. The elevated temperature used is sufficient to dry the impregnating material and press pressure is relatively high as around two thousand pounds per square inch as contrasted with a customary pressure of around two hundred pounds per square inch, a purpose of the high pressure being to compress the wood fibres and form smooth exposed surfaces.

While this impregnating process is undoubtedly capable of producing a plywood that is substantially moisture-inert, the process is objectionable in that it requires vacuum and pressure impregnating apparatus, takes considerable time and requires a considerable investment of stock at an intermediate stage of manufacture, and necessitates the handling of usually somewhat tacky materials. Furthermore, the process does not permit any less than complete impregnation with accurate knowledge of the resin content of the wood. It is not feasible to attain an accurately predetermined partial permeation of the wood by the resin or whatever the penetrating material may be. There are many uses of plywood not requiring complete impregnation of the wood so long as the wood is rendered sufficiently moisture-inert for the intended purpose.

It is an object of the present invention to provide a dry process for impregnating, and also for bonding together, the veneer or fibrous sheets of the plywood or laminated structure, that is to say, a process free from any liquid or tacky material at least while the laminations are being handled and up to the time they are subjected to heat and pressure of the press.

It is a further object of the invention not only to impregnate the various plies of a plywood board, and to bond the plies together, but to provide the board with smooth exposed faces which, if the faces of the pressure plates of the press are polished, take on a polished appearance which is highly desirable for many purposes especially when the product of the invention is used for the exposed surface of aircraft, furniture and the like.

It is also an object of the invention to provide the plywood board with a smooth water impermeable surface through which the grain of the underlying wood is clearly visible.

Still another object is to accomplish impregnation of the wood veneers or plies while the plies are being combined and while the composite structure is being formed with curves and even compound curves, the impregnations occurring after or simultaneously with the shaping of the individual plies in their superimposed relation.

A further object is generally to improve upon moisture-inert plywood structures and methods of making them.

Fig. 1 is a perspective view, greatly enlarged, of a portion of a composite board or panel incorporating the present invention.

Fig. 2 is a view of the various sheets entering into the formation of the board of Fig. 1, the sheets being separated to illustrate them more clearly.

Fig. 3 is an enlarged sectional detail of a portion of the composite board, illustrating the manner in which the water-proofing material permeates the wood plies.

Fig. 4 is a view of a modified form of impregnated board wherein the outer impregnating sheets are omitted.

Figs. 5, 6 and 7 illustrate the successive steps of forming a curved impregnated board; Fig. 5 showing the stack of alternated loose veneer and carrier sheets in the open dies of a press; Fig. 6 showing how the sheets slip over each other as the stack is bent; and Fig. 7 showing the reduced thickness of the stack when submitted to full pressure and temperature.

The invention is herein illustrated as embodied, in part, in a composite or plywood board or panel 10 having three wood veneer plies 12, 14, 16 assembled with crossed grain although any number of veneer plies can be used. My invention has the advantage of providing the strength, rigidity and other characteristics approaching a board formed of seven veneer plies as will be apparent hereinafter and is much superior in strength and rigidity to a three ply board with the plies separately impregnated as described in the first part of this specification and hence permits a reduction in the number of wood plies.

To permeate the wood veneer plies with a water-proofing material and also to cause the plies to be bonded together I insert between each pair of veneer plies and also, for some purposes, apply to the top and to the bottom of the stack ultimately forming the board a special carrier sheet. As illustrated, there is such a sheet 18 between the veneer plies 12 and 14, a similar sheet 20 between the veneer plies 14 and 16, and similar sheets 22 and 24 on the top and bottom of the plies or upon the top veneer ply 16 and under the veneer ply 12. The carrier sheets 18, 20, 22, 24 are or can be identical. Each sheet is a loosely felted paper sheet, having the nature of a blotting sheet, and is soft, compressible, absorbent and of a thickness approaching but not necessarily equalling the thickness of a veneer sheet. For wood veneer plies one-twentieth of an inch thick I have very successfully used carrier sheets thirty-eight thousandths of an inch thick. Each carrier sheet is impregnated with a water-proofing material for the wood veneer plies as, for instance, an artificial resin such as a phenol resin or a urea resin the particular material depending upon the requirements for the board. I have used a carrier sheet containing a phenol resin with good results, the sheet of the above thickness containing forty percent of resin, that is to say, one hundred pounds of paper sheet containing forty pounds of resin. The paper sheet can contain more resin but for many purposes more resin has not been found necessary. The resin content can, of course, be adjusted to suit specific requirements of the board of my invention. The paper with the resin in it is dry and free from any feeling of tackiness and is strong to resist tearing or breakage under the ordinary conditions of handling in making my board and lies flat. The carrier sheet can be impregnated with the resin in any usual or suitable manner not herein important as, for instance, passing a web of the paper from which the sheet is cut through a liquid solution of the resin, incorporating the resin in suitable condition in the beater with the pulp stock from which the paper is formed, and the like.

The thickness of the carrier sheet and the resin content thereof can be adjusted to the amount of veneering required to be permeated by the resin. While I have found a carrier sheet of thirty-eight thousands of an inch having a forty percent resin content to give good results with one-twentieth of an inch veneering, for thicker veneers the sheet thickness or the resin percentage, or both, can be increased. Conversely, a thinner carrier sheet or a lower resin percentage, or both, can be used with a thinner veneer. I prefer, however, a relatively thick carrier sheet for the increased strength, in the laminated board, imparted by the sheet.

In forming my composite impregnated board, the dry open or unimpregnated veneer sheets are assembled with intervening dry carrier sheets as illustrated in Fig. 2, the sheets being superimposed and there being a carrier sheet on the bottom of the stack and another carrier sheet on the top of the stack, if the board is required to have smooth resin-exposed surfaces. The stack is positioned between the heated plates of a press, the plates having smooth or polished flat stock-engaging surfaces if the exposed surfaces of the stack are to be flat and also are to have a smooth polished appearance. The heated plates are then brought against the stack and the pressure is held for a time sufficient to cause the resin in the carrier sheets to become fluid to permeate the veneer plies and finally to become set or converted to its insoluble form. It will be understood that the resin in the carrier sheet exists therein, prior to the application of heat and pressure, in its intermediate or fusible stage. Under the combined action of the heat and pressure of the press the resin in the carrier sheets is fused or liquefied and a sufficient amount of it is caused to flow or to be forced out of the carrier sheets into the wood in intimate contact with the carrier sheets. The presence of the resin in the veneer plies can be seen by inspection of a cut section of the board and can be experimentally demonstrated by the negligible ability of the board to absorb water, the ability of the composite board to absorb water, when immersed in water for twenty-four hours, being only about or less than three percent, which is negligible for most purposes.

The temperature to which the stack is submitted in the press depends upon the nature of the resin and the temperature at which it becomes fluid and ultimately becomes converted to its third or final stage of permanent infusibility. For a phenolic resin at a pressure of or upwards of fifteen hundred pounds per square inch a temperature of approximately three hundred fifty degrees Fahrenheit usually will be suitable, this temperature and pressure being held sufficiently long to effect the permeation of the veneer plies and the solidification of the resin in the plies and in the carrier sheets. For impregnating and bonding a board having one-twentieth of an inch thick wood plies, it is satisfactory to hold a pressure of fifteen hundred pounds and a temperature of three hundred degrees Fahrenheit for fifteen minutes. For five plies of one-twentieth of an inch veneer the same temperature and pressure is held for twenty-five minutes. These temperatures, pressures and times are variable and depend upon the nature of the resin and the number of stacks in the press, among other things. The carrier sheet I am at present using contains a resin that sets in ten minutes approximately at a temperature of three hundred fifty degrees Fahrenheit.

The pressure employed is high compared with the pressure of around two hundred pounds per square inch normally used in making the usual plywood board wherein the pressure used only is sufficiently high to secure a good bond between the plies. The relatively high pressure I employ forces the resin of the carrier sheets, liquefied by the heat, into the wood plies so that the plies are permeated by the resin, the resin entering the wood plies from both faces, in all plies, in the form illustrated in Fig. 1, so that the wood for most practical purposes, as in aircraft, furniture, house finish, etc., is water-proof and but to an immaterial degree water absorbent. The high pressure also has the important effect of compressing or condensing the carrier sheets and to a lesser extent, the veneer plies and the fibres of the carrier sheet are forced into intimate association with the fibres of the veneer plies, so that they occupy the valleys between grain ridges of the veneer plies. Where a stack of unpressed sheets, as illustrated in Fig. 2, consisting of three sheets of one-twentieth of an inch wood veneer and four carrier sheets thirty-eight thousandths of an inch thick, totals three hundred and two thousandths of an inch in thickness, the finished board or panel, as illustrated in Fig. 1, is approximately one hundred fifty-eight thousandths of an inch in thickness, which is a reduction of one hundred forty-four thousandths of an inch or approximately fifty percent, most of which occurs in the soft compressible carrier sheets which are reduced probably seventy-five percent or better, although some occurs in the veneer sheets where the fibres are compacted and the density is increased and the faces leveled. The compacting of the carrier sheets raises the resin content therein beyond the saturation point so that resin is available for impregnating or permeating the wood plies. As a result of the compressing action the carrier sheets become completely saturated with resin which bonds the loosely felted fibres strongly together and to the contacting wood plies so that all plies are strongly bonded together by solid and substantially thick sheets of resin permeated by paper fibres. The surface carrier sheets in the finished board, Fig. 1, present a hard dense surface which is smooth and shiny if the press plates have corresponding surfaces, offering but little resistance to air flow when the boards are used in aircraft and presenting a finished surface needing no ornamentation or other coating for this purpose or for furniture or the like.

It is a peculiarity of the present invention that, when the resin is clear or transparent, the grain of the wood veneer shows clearly through the outer carrier sheets which would seem to indicate the substantially complete penetration of the fibres comprising the carrier sheet by the resin, as well as the considerable reduction in thickness of the sheet. The presence of the grain of the wood veneer is not necessarily of value for many purposes of the composite board but is particularly valuable in furniture where the display of the grain of the wood is the chief surface ornamentation of the article.

The nature of the wood composing the veneer plies is not important for many purposes except that it should be capable of penetration by the resin under a suitable pressure but I prefer a veneer made from a deciduous wood such as beech, birch, for reasons of close and even grain and strength. For use in furniture or where the grain is desirable by reason of its figure a wood can be selected that has an appropriate grain figure. In my board, however, the grain of the wood seems to be accentuated through the outer resin and carrier sheet so that a grain of minor importance in the natural surface becomes interesting when superimposed by the compressed carrier sheet.

While in Fig. 1 I have shown carrier sheets as comprising the end plies of the stack, these are not essential for wood ply impregnation and can be omitted as illustrated in Fig. 4. In this case, the impregnation of the outer wood plies 12, 16 or the permeation thereof by resin is accomplished entirely by the inner carrier sheets 18, 20. By proper selection of the thickness and resin content of the carrier sheets the outer wood plies become permeated with resin to resist absorption of any deleterious amounts of water and in fact all wood plies appear to contain equal amounts of resin notwithstanding that the middle veneer ply 14 can draw resin from both carrier sheets. It would seem that resin in excess of that which the pores of the middle veneer sheet can contain is diverted to the outer veneer sheets.

The strength of the composite board is greatly superior to that of a board of the same number of veneer plies bonded together by the same resin as the compressed carrier sheets act as strengthening plies, contributing not only strength but rigidity. Thus a board constructed as in Fig. 1, and containing three veneer plies and four carrier sheet plies approaches the strength and rigidity of a seven wood veneer ply board of usual glued construction.

The process herein disclosed is not only applicable to the manufacture of flat composite boards but to curved structures and those having compound curves as in the fuselage of an airplane. While plywood cannot be bent in a compound curve a single sheet of wood veneer, and also the carrier sheet, can be so bent. Thus by assembling the separate sheets in a stack between appropriate dies the sheets are caused to conform to the dies as they close, the sheets slipping over each other to assume the proper curve. When the dies close upon the assembly with suitable heat and pressure the wood plies not only become permeated with resin and hence rendered immune to moisture but all sheets are bonded permanently together in the shape imparted to them by the dies.

Figs. 5, 6 and 7 illustrate the successive steps in forming a curved composite board of my invention. The stack of dry flat sheets is disposed in the curved recess $a$ of a press die $b$, similar edges of the sheets of the stack terminating in the same plane. As the cooperating die $c$ bends the stack into the recess the sheets become displaced or slide over each other as illustrated in Fig. 6. With full pressure on the stack and with the die temperature high enough and held long enough, the carrier sheets become compressed and the freed resin permeates all sheets and the stack becomes of reduced thickness as illustrated in Fig. 7, and retains this reduced thickness and curved form when removed from the press.

It is, of course, understood that the resin in the carrier sheet, if the resin is a phenol or urea resin or the like, is in a form capable of being converted to a liquid under the temperature and pressure of the combining press and of changing to a solid form at such temperature and pressure. Such a resin is known as thermo-setting. My invention, however, is not necessarily limited to the use of an artificial resin although such resin has particular advantages for my purposes. In its broader aspect, my invention consists in impregnating the associated wood veneer or fibrous sheets by the use of an interposed sheet having a material capable of penetrating the associated sheets and being of such thickness or having a sufficient amount of impregnating material that under appropriate combining conditions, as by heat and pressure, the impregnating material is caused to impregnate the fibrous sheets and also to bond them together.

I claim:

1. The method of making an impregnated composite board which comprises providing a compressible resin-impregnated carrier sheet having the character that it is compressible to less than half its thickness when subjected to pressure of at least fifteen hundred pounds per square inch, assembling the carrier sheet in a dry state between two wood veneer sheets, followed by subjecting the assembled sheets to pressure of at least fifteen hundred pounds per square inch in the presence of heat, thereby to compress the carrier sheet to less than half its initial thickness, accompanied by fusing of the resin therein, and to force relatively large amounts of resin from the carrier sheet into the wood veneer sheets, and maintaining said pressure until the resin has permeated substantial interior regions of the wood veneer sheets and has become set.

2. The method of impregnating a wood veneer sheet which comprises applying to a broad face of the veneer sheet a dry resin-containing fibrous sheet having the character that it is compressible to less than half its thickness when subjected to pressure of at least fifteen hundred pounds per square inch, and having resin therein in amount providing relatively large extrusion thereof when said fibrous sheet is compressed, pressing the two sheets together under pressure of at least fifteen hundred pounds per square inch, in the presence of heat, thereby to compress the fibrous sheet to less than half its initial thickness and to force a relatively large amount of resin extruded therefrom into the veneer sheet, and maintaining said pressure and heat until the resin has permeated substantial interior regions of the veneer sheet and has become set.

3. The method of making a resin impregnated multiple-ply composite board which comprises assembling in stacked relation a series of sheets alternately of wood and of loosely associated fibres, the fibre sheets having a relatively large amount of a thermo-setting resin therein and being compressible to less than half their thickness under a predetermined pressure, applying to the assembled sheets in the presence of heat said predetermined pressure of at least fifteen hundred pounds per square inch, thereby to compress the fibre sheets to less than half their initial thickness with extrusion of a relatively large percentage of resin from each fibre sheet and to force said extruded resin into interior regions of the wood sheets, and maintaining said heat and pressure until the resin has permeated substantially the entire thickness of the wood sheets and has become set.

4. The method of making a resin impregnated multiple-ply composite board which comprises assembling in stacked relation a series of sheets alternately of wood and of loosely associated fibres, the fibre sheets having a relatively large amount of a thermo-setting resin therein and being compressible to less than half their thickness under a predetermined pressure of magnitude to compress the wood sheets materially, applying to the assembled sheets in the presence of heat a said predetermined pressure capable of compressing the wood sheets materially, thereby to compress the fibre sheets to less than half their initial thickness with accompanying compression of the wood sheets, and to force resin extruded from the fibre sheets into sealing and binding relation to interior fibres of the wood sheets which have been re-organized by compression of the wood sheets.

BOARDMAN M. RANDALL.